US005099480A

United States Patent [19]

Murata

[11] Patent Number: 5,099,480

[45] Date of Patent: Mar. 24, 1992

[54] METHOD OF TESTING BIT ERRORS IN ISDN CIRCUITS

[75] Inventor: Yazuru Murata, Tokyo, Japan

[73] Assignee: Ando Electric Co., Ltd., Tokyo, Japan

[21] Appl. No.: 455,958

[22] Filed: Dec. 21, 1989

[30] Foreign Application Priority Data

Dec. 28, 1988 [JP] Japan .................................. 63-5081

[51] Int. Cl.[5] .............................................. G06F 11/00

[52] U.S. Cl. ...................................... 371/20.4; 370/13

[58] Field of Search ....................... 371/20.4, 20.5, 34, 371/25.1, 68.2; 370/13, 15, 14

[56] References Cited

U.S. PATENT DOCUMENTS

| | | | |
|---|---|---|---|
| 3,069,498 | 12/1962 | Frank | 371/20.4 X |
| 3,380,023 | 4/1968 | Magnuski | 371/20.4 X |
| 3,562,710 | 2/1971 | Halleck | 371/20.4 X |
| 4,156,110 | 5/1979 | Keeney | 370/14 |
| 4,730,313 | 3/1988 | Stephenson | 371/11.2 X |
| 4,922,482 | 5/1990 | Tanahashi | 270/13 |
| 4,989,202 | 1/1991 | Soto | 371/15.1 X |
| 4,999,836 | 3/1991 | Fujiwara | 370/60 X |

*Primary Examiner*—Robert W. Beausoliel

*Attorney, Agent, or Firm*—Flynn, Thiel, Boutell & Tanis

[57] ABSTRACT

A method of testing bit errors in an ISDN circuit by employing a tester having the function of a terminal and by using the information channels of the frame of an ISDN. The tester sends out a known data pattern generated by a pattern generator to the ISDN by a sending circuit, receives the data pattern transmitted through the ISDN by a receiving circuit, and compares the known data pattern generated by the pattern generator and the received pattern data to detect errors in the circuit of ISDN. The method is capable of detecting errors in the circuit and confirming the quality of the circuit and the operating condition of the ISDN without requiring any additional special function of the circuit and without disturbing the communication of terminals connected to the ISDN.

5 Claims, 5 Drawing Sheets

METHOD OF TESTING BIT ERRORS IN ISDN CIRCUITS

BACKGROUND OF THE INVENTION

1. Field of the Invention

The present invention relates to a method of testing the quality of circuits interconnecting terminals and a network and the action of the network by using channels B1 and B2 of a frame specified in CCITT-I. 430.

2. Description of the Prior Art

The connection of a network and terminals will be described with reference to FIG. 7.

Shown in FIG. 7 are terminals 11, 12 and 13, a network (hereinafter, abbreviated to "NW") 23, and a digital service unit (hereinafter, abbreviated to "DSU") 24. The NW 23 is the general designation of a system including the DSU 24, transmission lines, switching system, and the associated equipment. The teminals 11, 12 and 13 of the ISDN are connected to the DSU 24 by a T-line 21 and an R-line 22 for communication with terminals connected to the NW 23. The T-line 21 and the R-line 22 constitute a data bus. According to CCITT-I. 430, eight terminals at the maximum can be connected to a DSU.

FIG. 8 shows an essential portion of a diagram 3/I. 430 of a frame system specified by CCITT-I. 430. As shown in FIG. 8, a frame system comprises a frame A for transmitting data from the terminal 11 to the DSU 24, and a frame B for transmitting data from the DSU 24 to the terminal 11. The frames A and B for exchanging data between the terminals and the DSU 24 have channels D for signals, and channels B1 and B2 for data. The-frame B has channels E designated as echo bits. Since eight terminals at the maximum are connected to a single DSU, race in transmission from the terminals to the DSU along the channel D must be controlled. The channels E are used for race control. The terminal must carry out a channel D call control procedure along the channel D to acquire the right of use of the channel B. Upon the acquisition of the right of use of a line, the terminal sends necessary information along the channel B of the frame A to a called terminal. However, the conventional terminal equipment is unable to decide whether or not the information sent out is received correctly through the NW 23 by the called terminal.

SUMMARY OF THE INVENTION

Accordingly, it is an object of the present invention to enable a tester to test, by using the two information channels for data communication of a frame of an ISDN, the ISDN circuit to decide whether or not a data pattern transmitted through the ISDN is transmitted correctly by occupying the two channels by the tester additionally provided with a circuit for sending the data pattern along one of the two channels and detecting the data pattern from the other channel and for comparing the data pattern sent along the former channel and the data pattern received through the latter channel.

The above and other objects, features and advantages of the present invention will become more apparent from the following description taken in conjunction with the accompanying drawings.

DESCRIPTION OF THE PREFERRED EMBODIMENT

Figure 2:
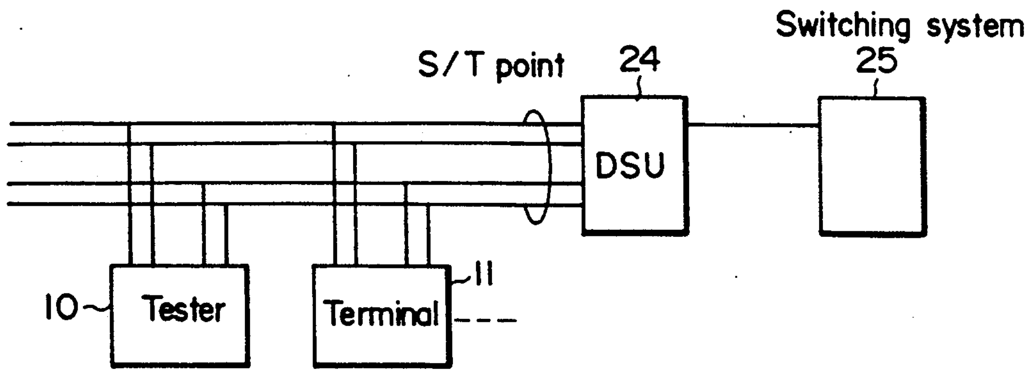
FIG. 2 is a block diagram showing the connection of the tester of FIG. 1 to an ISDN.

FIG. 2 is a general view of a reference point S/T in an ISDN user network interface, in which a tester 10 in a first embodiment according to the present invention is connected, similarly to terminals 11, 12 and 13, to a T-line 21 and an R-line 22 as one of the terminals. the reference point S/T is specified in the CCITT-I series.

Figure 1:
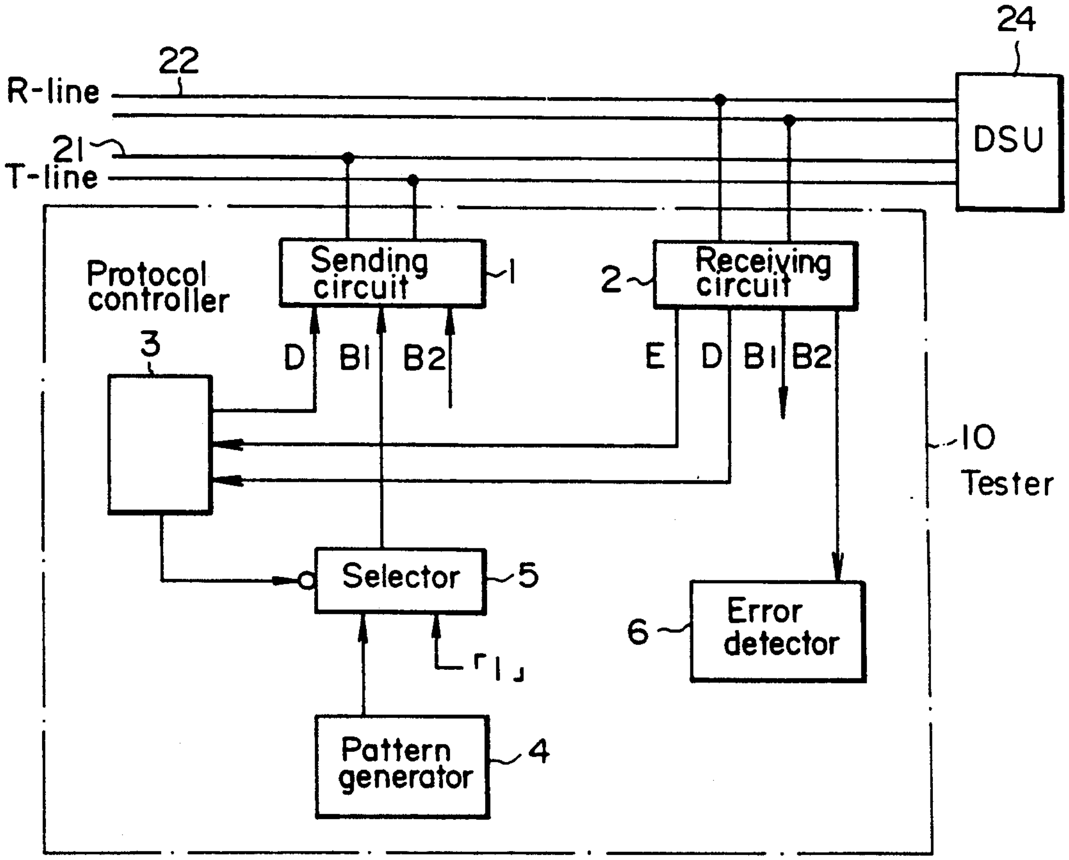
FIG. 1 is a block diagram of a tester in a first embodiment according to the present invention.
Figure 8:
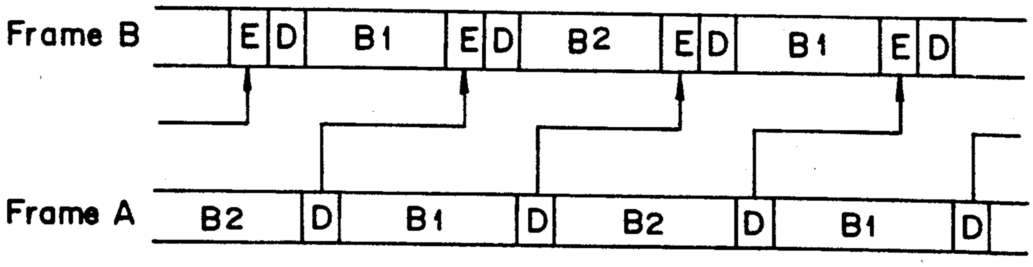
FIG. 8 (PRIOR ART)
FIG. 8 is a diagram showing an essential portion of a frame specified in CCITT-I. 430.

Referring to FIG. 1, the tester 10 comprises a sending circuit 1, a receiving circuit 2, a protocol controller 3, a pattern generator 4, a selector 5, and an error detector 6. FIG. 1 shows a circuit testing mode in sending data to a channel B1 of a frame A (FIG. 8) and receiving data from a channel B2 of a frame B.

The protocol controller 3 executes control operations specified in "ISDN User Network Interface: Layer 1 Advice", "ISDN User Network Interface: Layer 2 Advice" and "ISDN User Network Interface: Layer 3 Advice".

The Layer 1 is designated as "physical layer", and specifies conditions for electrical connection and frame structure. In this embodiment, the protocol controller 3 executes race control in sending data along a channel D. The Layer 2, i.e., a data link layer, specifies a frame structure, factors of procedure, field format and procedure for the appropriate execution, of a link access procedure (LAPD) for the channel D. The layer 3 specifies functions relating to the setting and operation of network connection.

The pattern generator 4 generates a pseudorandom pattern.

The selector 5 receives data generated by the pattern generator 4 and data "1" and sends the output data of the pattern generator 4 or the data "1" selectively according to a control signal provided by the protocol controller 3 to the sending circuit 1. In FIG. 1, the output of the selector 5 is connected to the channel B1 of the frame A. The output lines of the sending circuit 1 are connected T-lines 21.

Figure 3:
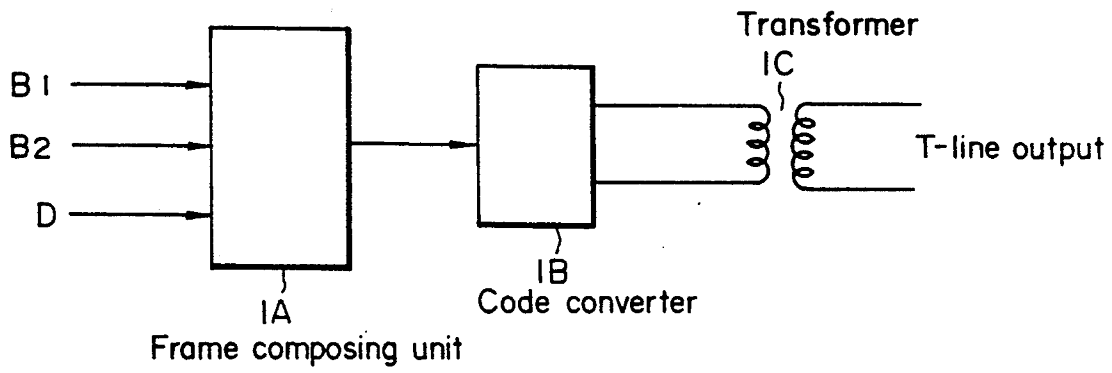
FIG. 3 is a block diagram showing the structure of a sending circuit.

Referring to FIG. 3, the sending circuit 1 comprises a frame composing unit 1A, a code converter 1B, and a transformer 1C. The frame composing unit 1A multiplexes input data received through channels B1, B2 and D, composes the input data in a frame specified in CCITT-I. 430, and gives a resultant frame signal to the code converter 1B. The code converter 1B converts the frame signal into an AMI signal. The AMI signal is transferred through the transformer 1C to the T-lines 21.

The receiving circuit 2 receives data from the R-lines 22. In the example shown in FIG. 1, an R-line output is applied to the channel B2 of the frame B.

Figure 4:
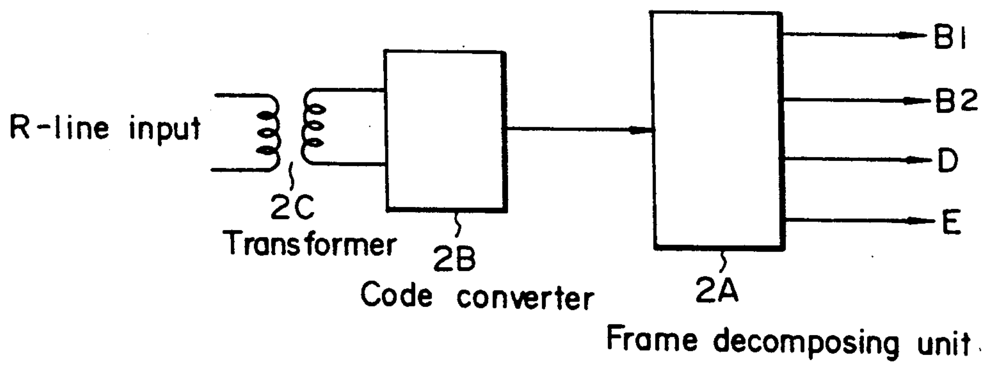
FIG. 4 is a block diagram showing the structure of a receiving circuit.

Referring to FIG. 4, the receiving circuit 2 comprises a frame decomposing unit 2A, a code converter 2B, and a transformer 2C. The AMI signal received by the transformer 2C through the R-line 22 is converted into an NRZ signal by the code coverter 2B, and then the frame decomposing unit 2A extracts data patterns of the channels B1, B2, D and E from the NRZ signal.

Figure 5:
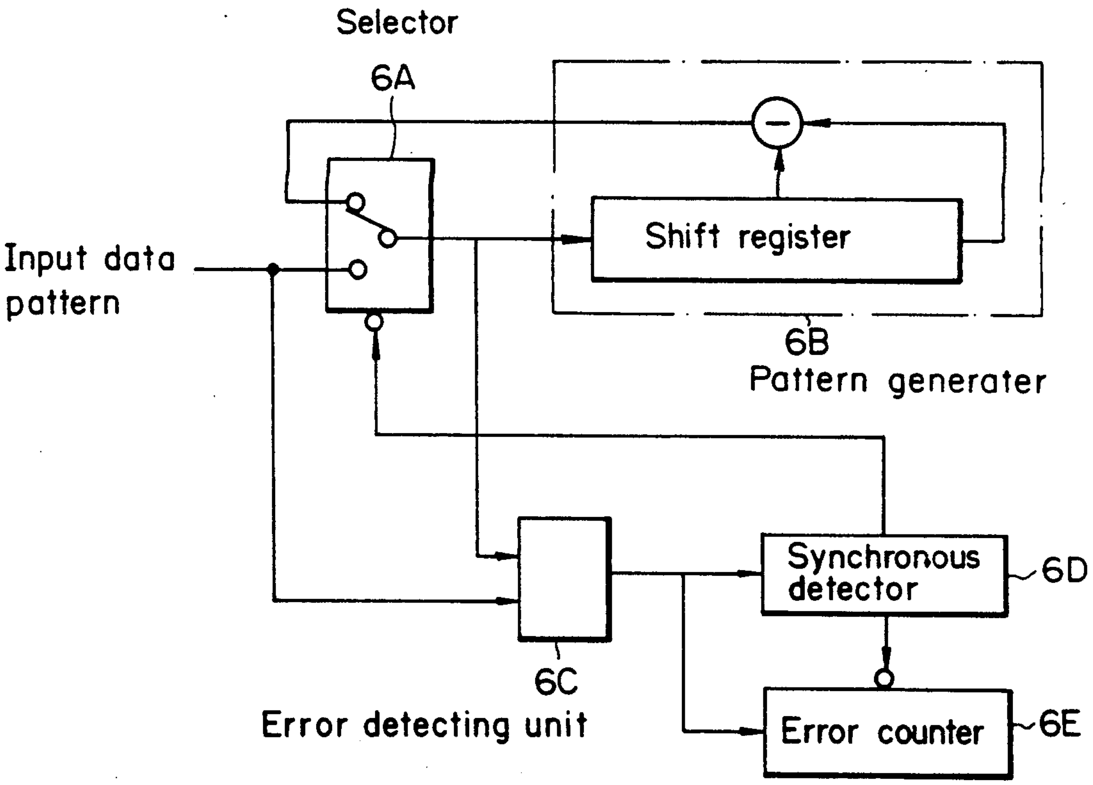
FIG. 5 is a block diagram showing the structure of an error detector.

The error detector 6 receives the output signal of the receiving circuit 2 and compares the output signal of the receiving circuit 2 with the output pattern signal of the pattern generator 4 to detect errors. As shown in FIG. 5, the error detector 6 comprises a selector 6A, a pattern generator 6B, an error detecting unit 6C, a synchronous detector 6D, and an error counter 6E. The output data of the receiving circuit 2 transmitted through the channel B2 to the error detector 6 is applied to the error detecting unit 6C and the selector 6A. The selector 6A transfers the data for the channel B2 through a first path to the input of the shift register of the pattern generator 6B and to the error detecting unit 6C, and transfers the output signal of the pattern generator 6B through a second path to the input of the shift register of the pattern generator 6B and to the error detecting unit 6C. The synchronous detector 6D operates according to a control signal to select the first path for pattern signal synchronization or to select the second path for error counting. As shown in FIG. 5, the selector 6A first selects the first path to apply the data on the channel B2 of the receiving circuit to the pattern generator 6B and to store the data. Then, the selector 6A selects the second path to compare the data on the channel B2 of the receiving circuit 2 and the data provided by the pattern generator 6B and to give error information to the error counter 6E and the synchronnous detector 6D. The synchronous detector 6D decides, when no error is detected in a fixed time, that the pattern cannot be synchronized, and then gives an error, count start signal to the error counter 6E, and gives the selector 6A a signal to apply the output signal of the pattern generator 6B to the error detecting unit 6C to start counting errors.

The operation of the tester 10 will be described hereinafter with reference to FIG. 1. One circuit is able to use two information channels B1 and B2. Therefore, two terminals can communicate simultaneously when each terminal uses one channel. The present invention uses the channels B1 and B2 for bit error tests. Since the tester 10 occupies the channels B1 and B2, the bit error tests can be started only when the channels B are not used by any other terminals.

The protocol cotroller 3 exchanges messages with the network through the channel D according to procedures specified in Layer 1, Layer 2 and Layer 3 to connect the channels B1 and B2 on the circuit by a circuit switching network. The protocol controller 3 sends a call setting message of the Layer 3 including an originating address and a terminating address as information elements to the network. The originating address and the terminating address correspond respectively to the telephone number of the originating terminal and the telephone number of the terminating terminal. The address is assigned to one channel D on one interface. The protocol controller 3 enables circuit switching between the channels B1 and B2 on the same circuit by specifying the originating address and the terminating address by the same number, i.e., the address of the circuit to which the tester 10 is connected. Upon the confirmation of the connection of the circuit, the protocol controller 3 switches the selector 5 to apply the output data of the pattern generator 4 to the channel B1 of the T-line 21. Then, the network 23 sends the data sent to the channel B1 to the channel B2 of the R-line 22. The data sent to the channel B2 is received by the receiving circuit 2, and then the data is given to the error detector 6 to test the condition of the circuit.

Figure 6:
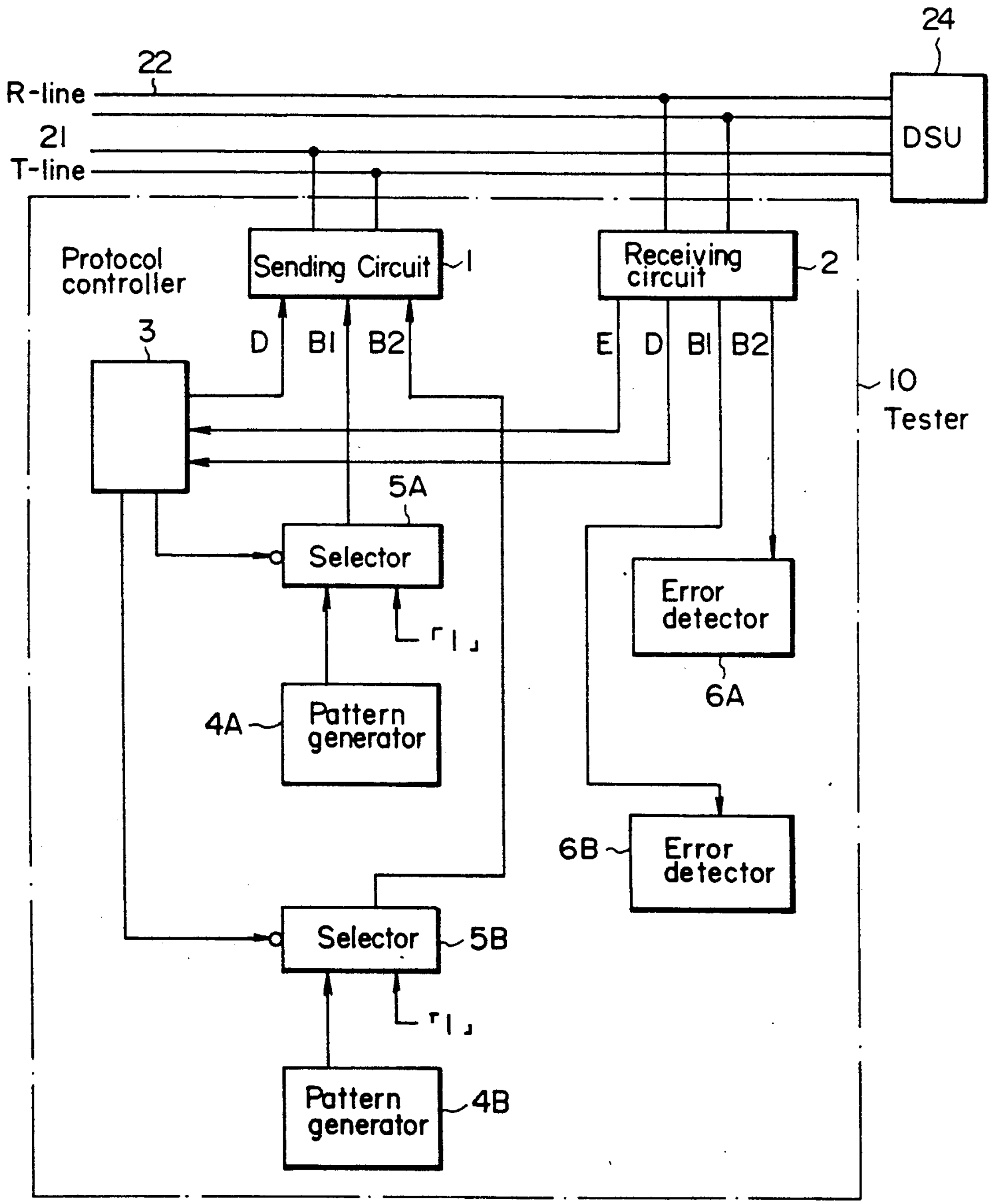
FIG. 6 is a block diagram of a tester in a second embodiment according to the present invention.
Figure 7:
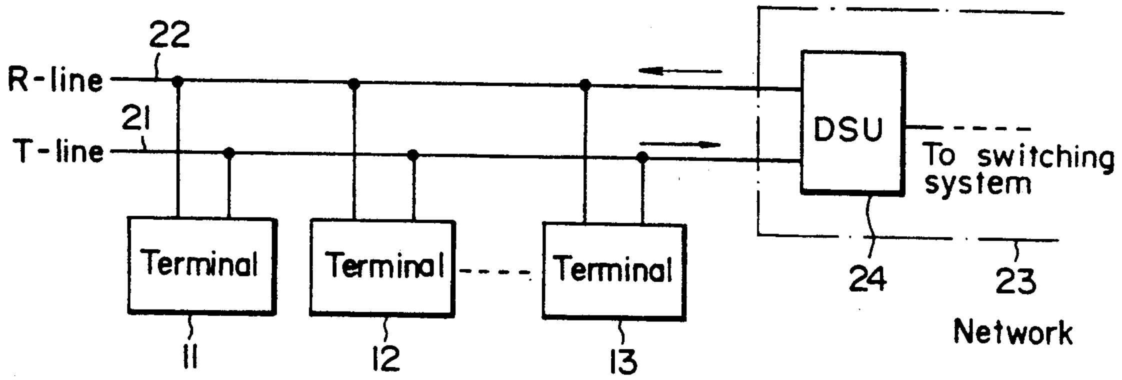
FIG. 7 (PRIOR ART)
FIG. 7 is a block diagram showing the connection of terminals to an ISDN.

FIG. 6 shows a tester 10 in a second embodiment according to the present invention. The tester 10 of FIG. 6 comprises, in addition to a pattern generator 4A, a selector 5A and an error detector 6A, which are the same as those of the tester 10 of FIG. 1, a pattern generator 4B, a selector 5B and an error detector 6B. The pattern generator 4B, the selector 5B and the error detector 6B are connected to the channel B2 of a sending circuit 1 and to the channel B1 of a receiving circuit 2 to test a circuit for transmitting signals from the channel B2 to the channel B1.

As is apparent from the foregoing description, the tester of the present invention having the functions of a terminal is able to test easily the quality of a circuit and the operation of a network without requiring additional special functions of the circuit and the network and without affecting communication between other terminals by sending a known data pattern to a network through the information channels of the frames of an ISDN, receiving the data pattern through the ISDN, and comparing the original data pattern and the received data pattern by the error detector to detect errors. The tester of an enhanced type of the present invention is capable of simultaneously testing data transmission from the channel B1 to the channel B2, and data transmission from the channel B2 to the channel B1 by using a single circuit.

Although the invention has been described in its preferred forms with a certain degree of particularity, obviously many changes and variations are possible therein. It is therefore to be understood that the present invention may be practiced otherwise than as specifically described herein without departing from the scope and spirit thereof.

What is claimed is:

1. A method of testing for errors in an ISDN circuit having a bus including T-lines and R-lines for connecting a plurality of terminals to a network which includes a digital service unit, comprising the steps of:

providing a test unit which includes a sending circuit having a B channel for sending out data on the T-lines, a receiving circuit having a B channel for receiving data from the R-lines, a protocol controller which executes channel D call control procedures, a pattern generator which generates a known data pattern, a selector which receives the data pattern of the pattern generator and sends a predetermined logic level or the data pattern of the pattern generator selectively to the sending circuit according to a control signal provided by the protocol controller, and an error detector which receives output data from the receiving circuit and detects errors by comparing the output data of the receiving circuit and the data pattern of the pattern generator;

connecting said test unit to said bus;

using the protocol controller to establish a test B channel which permits B channel communication between said sending circuit and said receiving circuit and which utilizes said T-lines and said network and said R-lines and said B channels of said sending circuit and said receiving circuit so that data sent out on the B channel of the sending circuit is received through the B channel of the receiving circuit;

switching the selector by means of the control signal from said protocol controller so that the data pattern generated by the pattern generator is applied to the sending circuit as input test data for the test B channel;

sending the input test data through the test B channel via the T-lines using the sending circuit, and receiving output test data from the test B channel via the R-lines using the receiving circuit; and using the error detector to compare the output test data to the input test data.

2. A method according to claim 1, wherein said predetermined logic level is a logic 1, wherein said test unit is connected to said bus at a reference point S/T as specified in CCITT-I, and wherein said protocol controller executes channel D call control procedures specified in CCITT Advice Series I.

3. A method of testing for errors in an ISDN circuit having a bus including T-lines and R-lines for connecting a plurality of terminals of a network which includes a digital service unit, comprising the steps of:

providing a test unit which includes a sending circuit having a plurality of B channels for sending out data on the T-lines, a receiving circuit having a plurality of B channels for receiving data from the R-lines, a protocol controller which executes channel D call control procedures, pattern generators which generate known data patterns, selectors which receive the data patterns from the pattern generators and send a predetermined logic level or the data patterns of the pattern generators selectively to the sending circuit according to control signals provided by the protocol controller, and error detectors which receive output data from the receiving circuit and detect errors by comparing the output data of the receiving circuit and the data patterns of the pattern generators;

connecting said test unit to said bus;

using the protocol controller to establish a plurality of test B channels which permit B channel communication between said sending circuit and said receiving circuit and which utilize said T-lines and said network and said R-lines and selected B channels of both said sending circuit and said receiving circuit so that data sent out on a first selected B channel of the sending circuit is received through a first selected B channel of the receiving circuit, and so that data sent out on a second selected B channel of the sending circuit is received through a second selected B channel of the receiving circuit;

switching the selectors by means of the control signals from said protocol controller so that the data patterns generated by the pattern generators are applied to the sending circuit as input test data for the test B channels;

sending the input test data through the test B channels via the T-lines using the sending circuit, and receiving output test data from the test B channels via the R-lines using the receiving circuit; and using the error detectors to compare the output test data to the input test data.

4. A method according to claim 3, wherein said predetermined logic level is a logic 1, and wherein said test unit is connected to said bus at a reference point S/T as specified in CCITT-I.

5. A method for testing for errors in an ISDN circuit having a bus including T-lines and R-lines for connecting a plurality of terminals to a switching network, comprising the steps of:

providing a test unit which includes a sending circuit having at least one B channel for transmitting data on the T-lines, a receiving circuit having at least one B channel for receiving data from the R-lines, and a protocol controller for executing D channel call control procedures;

connecting said test unit to said data bus with said sending circuit connected to said T-lines and said receiving circuit connected to said R-lines;

using the protocol controller to establish at least one test B channel which permits B channel communication between said sending circuit and said receiving circuit and which utilizes said T-lines and said switching network and said R-lines and selected B channels of both said sending circuit and said receiving circuit so that data transmitted on a selected B channel of the sending circuit is received on a selected B channel of the receiving circuit;

using the sending circuit to send into test data through the test B channel;

using the receiving circuit to receive output test data from the test B channel; and comparing the output test data to the input test data.

* * * * *

UNITED STATES PATENT AND TRADEMARK OFFICE
CERTIFICATE OF CORRECTION

PATENT NO. : 5 099 480

DATED : March 24, 1992

INVENTOR(S) : Yazuru Murata

It is certified that error appears in the above-identified patent and that said Letters Patent is hereby corrected as shown below:

On the title page, item (30): Foreign Application Priority Data, change "63-5081" to ---1-5081---.

Column 5, line 23; change "of a" to ---to a---.

Column 6, line 43; change "into" to ---input---.

Signed and Sealed this

Seventeenth Day of August, 1993

*Attest:*

Bruce Lehman

BRUCE LEHMAN

*Attesting Officer*

*Commissioner of Patents and Trademarks*